(12) United States Patent
Lee et al.

(10) Patent No.: US 9,794,394 B2
(45) Date of Patent: Oct. 17, 2017

(54) MOBILE TERMINAL

(71) Applicant: LG ELECTRONICS INC., Seoul (KR)

(72) Inventors: Haein Lee, Seoul (KR); Yoonji Moon, Seoul (KR); Egun Jung, Seoul (KR); Yongkyoung Shin, Seoul (KR); Jeehee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/190,849

(22) Filed: Jun. 23, 2016

(65) Prior Publication Data
US 2016/0309017 A1  Oct. 20, 2016

Related U.S. Application Data

(63) Continuation of application No. 14/245,623, filed on Apr. 4, 2014.

(30) Foreign Application Priority Data

Jul. 23, 2013 (KR) .......................... 10-2013-0086958

(51) Int. Cl.
  *H04B 1/38*   (2015.01)
  *H04M 1/00*   (2006.01)
  (Continued)

(52) U.S. Cl.
  CPC ........ *H04M 1/72569* (2013.01); *G06F 3/044* (2013.01); *G06F 3/0414* (2013.01);
  (Continued)

(58) Field of Classification Search
  None
  See application file for complete search history.

(56) References Cited

U.S. PATENT DOCUMENTS

2002/0037754 A1   3/2002   Hama et al.
2008/0146285 A1   6/2008   Lee et al.
(Continued)

FOREIGN PATENT DOCUMENTS

KR   10-2012-0101508 A   9/2012
WO   WO 2011/076981 A1   6/2011

OTHER PUBLICATIONS

J.Mugen, "iOS7—Quick Look on Iphone 5", youtube, Jun. 10, 2013, (https://www.youtube.com/watch?v=272Kp0Ggbo0), 1 page.

*Primary Examiner* — Moustapha Diaby
(74) *Attorney, Agent, or Firm* — Birch, Stewart, Kolasch & Birch, LLP

(57) ABSTRACT

A mobile terminal including a wireless communication unit configured to provide wireless communication; a touch screen having a front surface and curved surface extending from the front surface of the touch screen; and a controller configured to display an indicator informing an incoming call on the touch screen in response to receiving the incoming call, connect a call related to the incoming call, in response to an input for connecting the call related to the incoming call during displaying of the indicator informing the incoming call on the touch screen, display a first notification icon informing a missed call related to the incoming call at a first preset location on the curved surface of the touch screen if the input for connecting the call related to the incoming is not received, wherein the first notification icon is displayed after the indicator disappears from the touch screen, and display a first image including information related to the missed call on the touch screen in response to a first touch and drag from the first notification icon on the curved surface of the touch screen to the front surface of the touch screen. Further, the information related to the missed (Continued)

call includes at least one of a phone number or a name of a counterpart.

19 Claims, 14 Drawing Sheets

(51) Int. Cl.
| | |
|---|---|
| *H04M 1/725* | (2006.01) |
| *G06F 3/0486* | (2013.01) |
| *G06F 3/0488* | (2013.01) |
| *G06F 3/0481* | (2013.01) |
| *G06F 3/0485* | (2013.01) |
| *H04W 4/12* | (2009.01) |
| *G06F 3/041* | (2006.01) |
| *G06F 3/044* | (2006.01) |
| *H04B 1/3827* | (2015.01) |
| *H04M 1/02* | (2006.01) |

(52) U.S. Cl.
CPC ........ *G06F 3/0486* (2013.01); *G06F 3/04817* (2013.01); *G06F 3/04855* (2013.01); *G06F 3/04886* (2013.01); *H04B 1/3833* (2013.01); *H04M 1/0266* (2013.01); *H04M 1/72519* (2013.01); *H04M 1/72597* (2013.01); *H04W 4/12* (2013.01); *H04M 1/0268* (2013.01); *H04M 1/72566* (2013.01); *H04M 2250/22* (2013.01)

(56) References Cited

U.S. PATENT DOCUMENTS

| | | | |
|---|---|---|---|
| 2010/0156887 | A1 | 6/2010 | Lindroos et al. |
| 2010/0185960 | A1 | 7/2010 | Christie et al. |
| 2010/0293508 | A1 | 11/2010 | Hwang et al. |
| 2011/0069027 | A1* | 3/2011 | Kim .................... H04M 1/0283 345/173 |
| 2011/0148772 | A1 | 6/2011 | Oksman et al. |
| 2011/0151935 | A1 | 6/2011 | Oksman et al. |
| 2011/0294467 | A1* | 12/2011 | Kim ...................... G06F 1/1643 455/411 |
| 2012/0071211 | A1 | 3/2012 | Yokota |
| 2012/0236037 | A1* | 9/2012 | Lessing .................. G06F 3/017 345/661 |
| 2013/0076649 | A1 | 3/2013 | Myers et al. |
| 2013/0145311 | A1 | 6/2013 | Joo |
| 2013/0159417 | A1 | 6/2013 | Meckler et al. |
| 2013/0178248 | A1* | 7/2013 | Kim .................... H04M 1/0268 455/566 |
| 2013/0300697 | A1* | 11/2013 | Kim ...................... G06F 1/1626 345/173 |

* cited by examiner

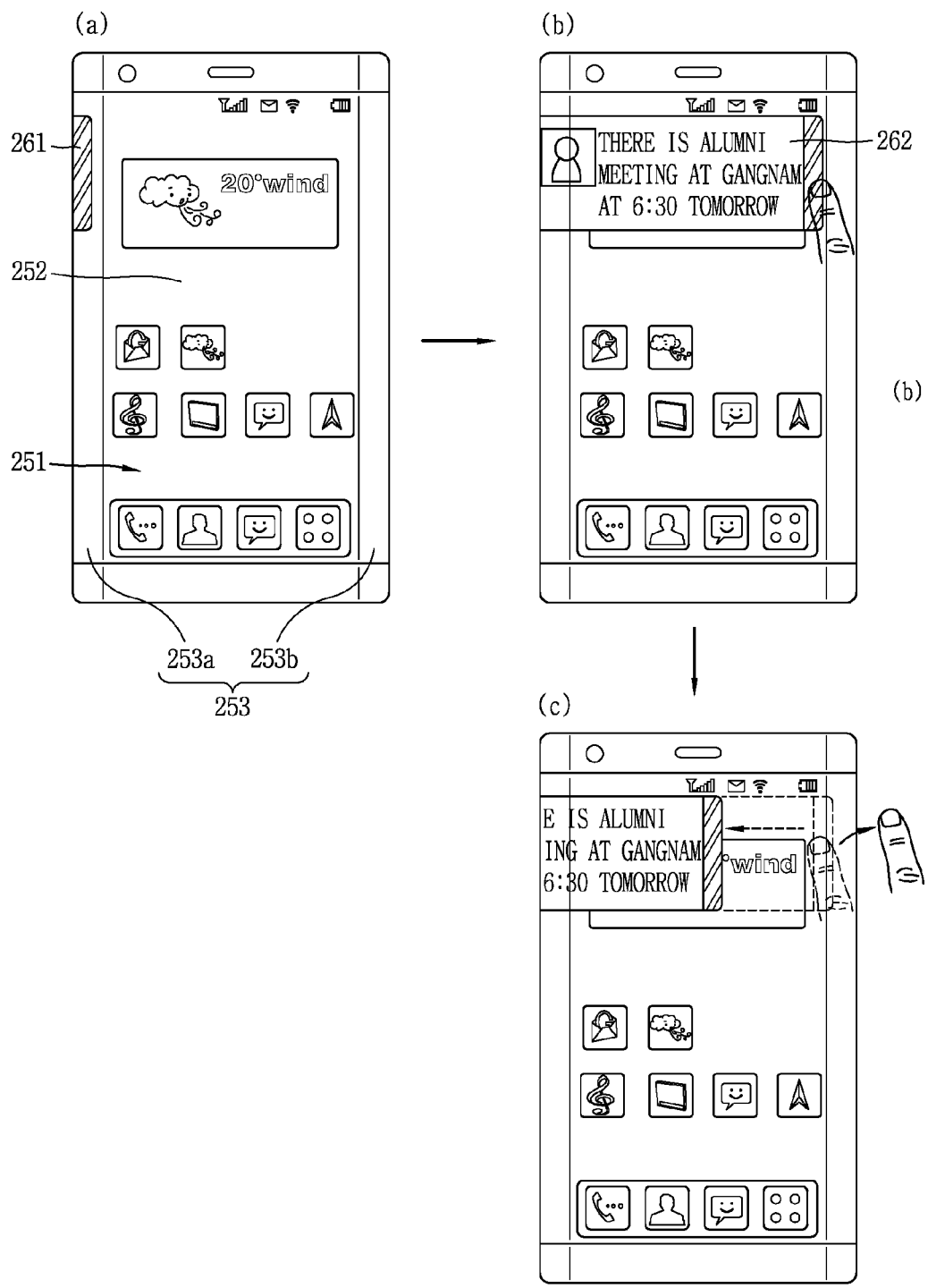

FIG. 12
(a)
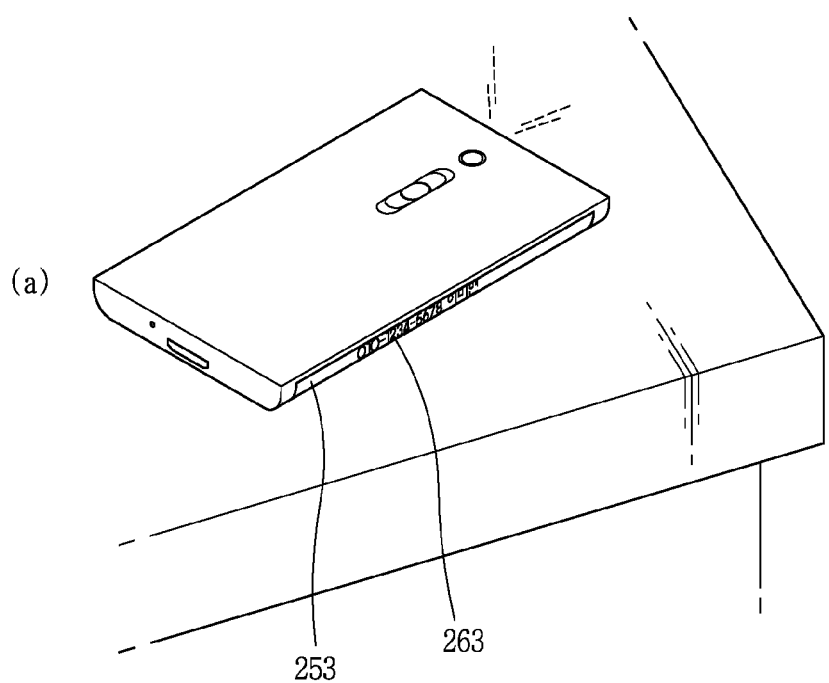
253  263
(b)
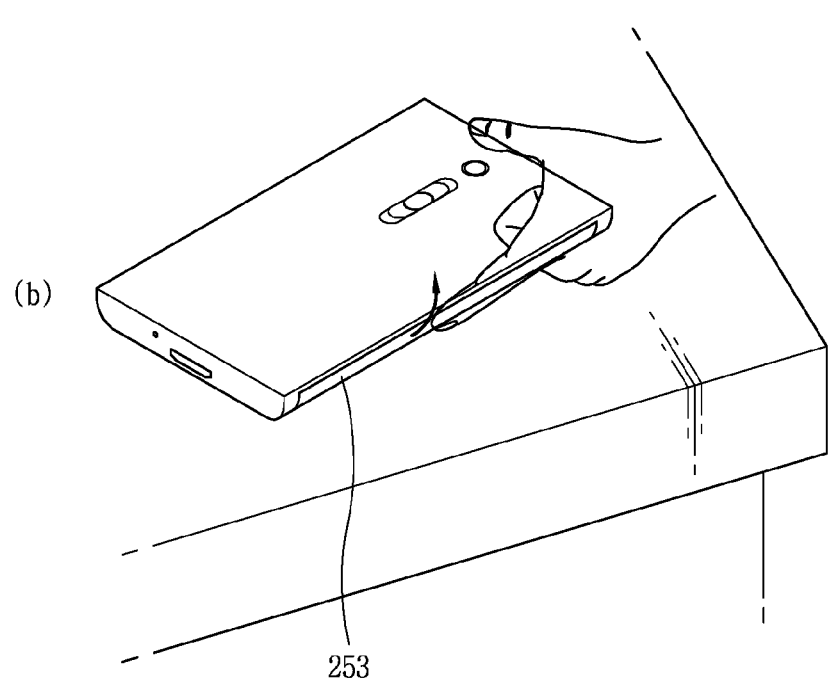
253

MOBILE TERMINAL

CROSS-REFERENCE TO RELATED APPLICATION

This application is a Continuation of co-pending application Ser. No. 14/245,623, filed on Apr. 4, 2014, which claims priority under 35 U.S.C. §119(a) to Application No. 10-2013-0086958, filed in Korea on Jul. 23, 2013, all of which are hereby expressly incorporated by reference into the present application.

BACKGROUND OF THE DISCLOSURE

1. Field of the Disclosure

The present invention relates to a mobile terminal, and particularly, to a mobile terminal having a side display. A side display is used to describe a display that is located on a side face of the terminal. This can be in addition to a display located on, for example, the front face.

2. Background of the Disclosure

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. As one example, a user interface for allowing a user to easily and conveniently search for or select a function is being provided.

As the mobile terminal is regarded as a personal belonging to express a user's personality, various designs are required. The designs include structural changes and improvements for allowing a user to more conveniently use the mobile terminal.

As one of such structural changes and improvements, a side display and a user interface using the same may be considered.

SUMMARY OF THE DISCLOSURE

Therefore, an aspect of the detailed description is to provide a mobile terminal capable of informing occurrence of an event using a side display.

Another aspect of the detailed description is to provide a mobile terminal capable of providing new type of notification and input functions differentiated from the conventional ones.

Still another aspect of the detailed description is to provide a method for controlling a mobile terminal, capable of outputting event-related information and controlling functions of the mobile terminal, through combination of a front display and a side display.

To achieve these and other advantages and in accordance with the purpose of this specification, as embodied and broadly described herein, there is provided a mobile terminal, comprising: a body having a front surface, side surfaces and a rear surface; a display unit having a first region arranged on the front surface as the front display, and a second region arranged on a side surface and extending from the first region as the side display; and a controller configured to output a notification icon to the second region when an event occurs from at least one application, the notification icon informing the occurrence of the event, and configured to display information on the event on the first region when a touch input is applied to the notification icon.

In an embodiment of the present invention, the second region may be provided with a left region and a right region disposed at a left side surface and a right side surface of the mobile terminal respectively, and the notification icon may be output to at least one of the left region and the right region. If a drag input is applied to the notification icon from one of the left region and the right region to another, the information may be displayed on the first region. An image, of which size is gradually changed according to a path of the drag input, may be generated at the first region. The information may be displayed within the image.

In another embodiment of the present invention, the image may be differently processed according to a release point of the drag input.

In another embodiment of the present invention, if the drag input is connected from one of the left region and the right region to another, a boundary of the image may be fixed to said another region. Information displayed within the image may be controlled using a touch input applied to the image, in a state where the boundary of the image is fixed.

In another embodiment of the present invention, a length of the notification icon may be variable according to an amount of information related to the event.

In another embodiment of the present invention, the first region may be divided into a first part and a second part. Information on the event may be displayed on the first part, and a screen output to the first region before the touch input is applied may be continuously displayed on the second part. If an application different from the event-occurred application is driven in a state where the event-related information is displayed on the first part, an execution screen for the different application may be output to the second part. The controller may sense a control command related to the information displayed on the first part, using a touch input applied to the second region.

In another embodiment of the present invention, if the event-related information is displayed on the first region, a scroll bar, which is configured to scroll the displayed information up and down, may be generated on at least part of the second region.

In another embodiment of the present invention, the mobile terminal may comprise a wireless communication unit mounted to the body and configured to receive wireless signals.

In another embodiment of the present invention, if an event occurs, for example when a call signal is received through the wireless communication unit, an indicator informing a user of the content of the event, for example the reception of the call signal, may be output to the second region, and the notification icon may be output if the event is not checked, for example, the notification icon may inform that a response has not been made with respect to the call signal. Upon detection of a touch input to the second region while the indicator is output, the controller may perform a control related to the event, for example a call connection. The indicator may move within the second region while the event occurs, for example, when the call signal is received, and may disappear when the notification icon is generated.

In another embodiment of the present invention, if a call signal is received through the wireless communication unit in a state where the front surface is covered by another object and the display unit is deactivated, the deactivated state of the display unit may be maintained, and an indicator informing reception of the call signal may be output to the second region.

In another embodiment of the present invention, if information is received through the wireless communication unit, at least part of the received information may be output to the second region.

If a control command for activating the display unit is input in a state where the second region has been touched, the controller may display the received information on the first region. Upon detection of touch inputs consecutively applied to the second region with time intervals, the controller may update the information output to the second region.

According to another aspect of the present invention, there is provided a mobile terminal, comprising: a body having a front surface, side surfaces and a rear surface; a wireless communication unit mounted to the body and configured to receive wireless signals; a display unit having a first region arranged on the front surface, and a second region arranged on a side surface and extending from the first region; and a controller configured to output, to the second region, a notification icon informing reception of the information, and configured to display the information on the first region when a touch input is applied to the notification icon.

In a further aspect, there is provided a method for controlling a mobile terminal comprising a body having a front surface, side surfaces and a rear surface; a display unit having a first region arranged on the front surface, and a second region arranged on a side surface and extending from the first region, the method comprising the steps of: detecting that an event has occurred from at least one application; outputting a notification icon indicating occurrence of the event to the second region of the display unit; detecting a touch input applied to the notification icon; and outputting information related to the event to the first region of the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 2 is a conceptual view illustrating an operation implemented by a mobile terminal of the present invention;

FIGS. 10 to 13 are conceptual views illustrating a plurality of embodiments related to reception of information.

DETAILED DESCRIPTION OF THE DISCLOSURE

Hereinafter, a mobile terminal of the present invention will be explained in more detail with reference to the attached drawings. The suffixes attached to components of the mobile terminal, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, etc.

Figure 1:
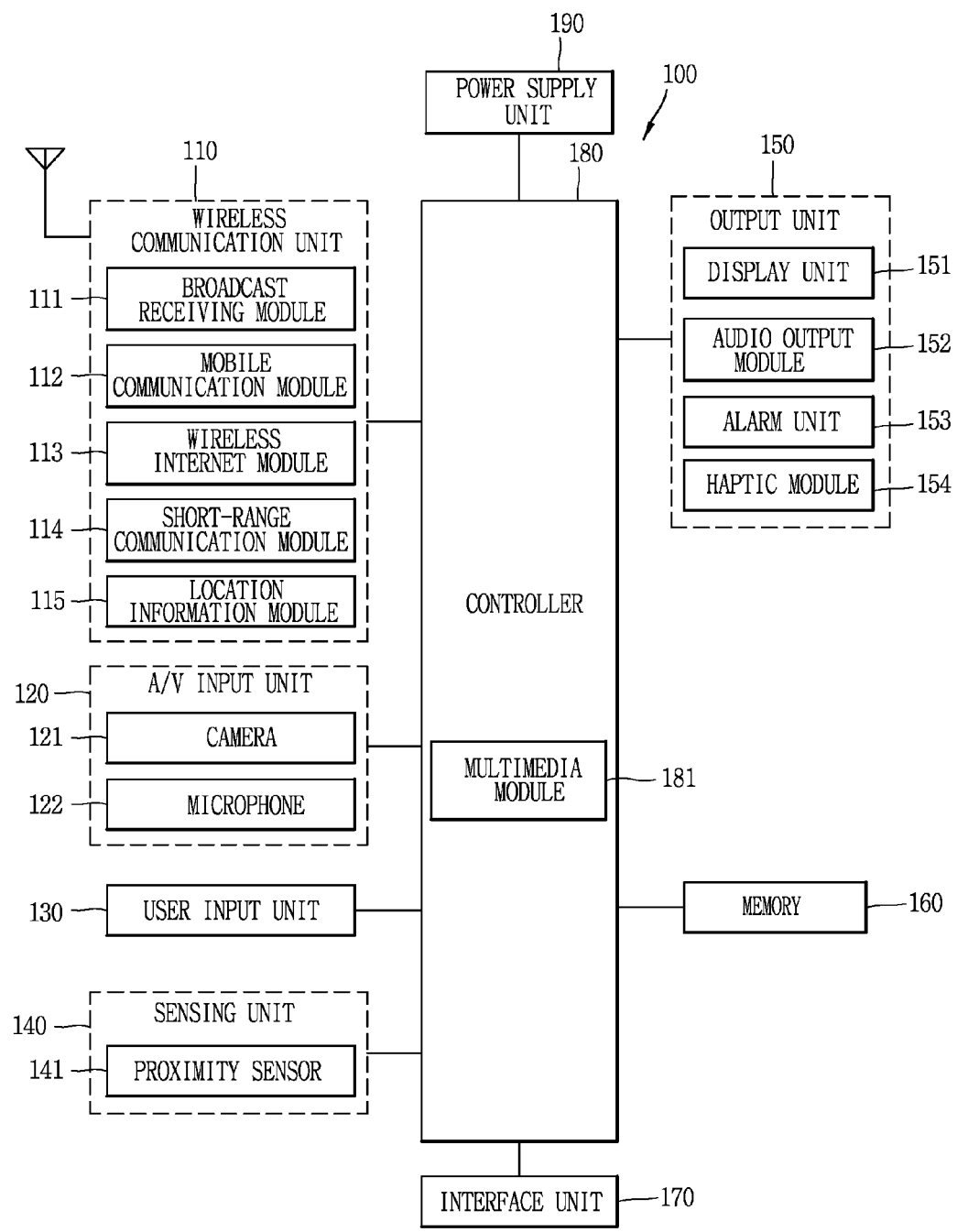
FIG. 1 is a block diagram of a mobile terminal according to an embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may mean a server for generating broadcast signals and/or broadcast-related information and transmitting them to the mobile terminal, or a server for receiving generated broadcast signals and/or is broadcast-related information and transmitting them to the mobile terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module. Referring to FIG. 1, the NV input unit 120 is configured to receive an audio or video signal. The NV input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like. The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a prescribed part of the display unit 151, or a capacitance occurring from a prescribed part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type is photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

An illumination sensor, a gyro sensor, etc. as well as the proximity sensor may be provided at the mobile terminal. The illumination sensor is configured to measure the amount of peripheral light, and the gyro sensor (called 'acceleration sensor') is configured to measure a moving speed and a position of the mobile terminal.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the to like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory is (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal

100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The display unit 151 will be explained in more detail. In the present invention, the display unit 151 is formed on the side surfaces as well as on the front surface. Under such configuration, the display unit can have a larger screen. That is, the present invention provides a mobile terminal having a front display and a side display, and a new type of user interface using the same. Hereinafter, the front display, the side display, and operations implemented by the displays will be explained in more detail with reference to the attached drawings.

FIG. 2 is a conceptual view illustrating an operation implemented by the mobile terminal of the present invention.

Referring to FIG. 2, a display unit 251 is provided with a first region 252 arranged on the front surface of the body, and a second region 253 extending from the first region 252 and arranged on the side surfaces of the body (wherein the side surface may be defined as a surface of the mobile terminal viewed from a lateral direction). The first region 252 and the second region 253 display different types of information, and are provided with different types of user graphic interfaces (GUI).

The second region 253 is provided with a left region 253a disposed on a left side surface of the mobile terminal, and a right region 253b disposed on a right side surface of the mobile terminal. Under such configuration, the second region 253 has a symmetric structure in right and left directions based on the first region 252.

Referring to FIG. 2(a), a home screen page may be output to the display unit 251 of the mobile terminal. The home screen page may include at least one object. The object may be an icon or a widget of an application installed at the mobile terminal. The home screen page may be output to an entire region of the display unit 251 including the first region 252 and the second region 253.

If an event occurs from at least one application, the controller outputs, to the second region 253, a notification icon 261 informing the event. However, the home screen page being output to the display unit 251 is merely exemplary, and a graphic user interface (GUI) of an application being currently executed is output to the display unit 251. In this state, the event may occur.

The display unit 251 may be provided with a touch sensor for sensing a touch input, so that a touch input to the notification icon can be sensed. The display unit 251 may output visual information implemented in the form of an image, a text, an icon, etc. And the display unit 251 may be converted into a deactivated state, by input of a specific control command or as time passes.

The notification icon 261 may be output to at least one of the left region 253a and the right region 253b. In this embodiment, the notification icon 261 is disposed at the left region 253a. The notification icon 261, which is a bar type is image long-formed along the side surface of the mobile terminal, may be displayed close to an upper end of the left region 253a.

Referring to FIG. 2(b), once a touch input is applied to the notification icon 261, the controller displays information on the event on the first region 252.

In this embodiment, the notification icon 261 indicates an incoming message. If a user applies a drag input to the notification icon 261, the controller outputs information on the event, to the first region 252. The event-related information is at least part of a message, which may be output in the form of a preview.

An image 262, of which size is gradually changed according to a path of the drag input, is generated at the first region 252. At least part of a message is displayed within the image 262. That is, information may be provided as the image 262 is unfolded according to a drag input, and content of a message to be output gradually appears. More specifically, the image may have an effect that folded paper becomes unfolded according to a drag input. The notification icon may move in association with the drag input.

Referring to FIG. 2(c), if the drag input is released, the event-related information disappears from the display unit 251. For instance, if a user's hand which is performing a drag input is detached from the display unit 251, the image 262 gradually disappears with moving to the left region. Under such configuration, information can be displayed for check of content, and then the information can disappear to be stored in the mobile terminal. This can allow a simple user interface to be implemented.

In the conventional art, various types of notifications are implemented in a mixed manner. As a result, a user may have a difficulty in viewing the screen, and it may take a lot of time to search required information. Further, as information is output to the entire screen in a covering manner, the user cannot view his or her task being currently performed. However, in this embodiment, such problems are solved.

The mobile terminal may provide information to a user in a novel manner, by controlling the side display.

Figure 3A:
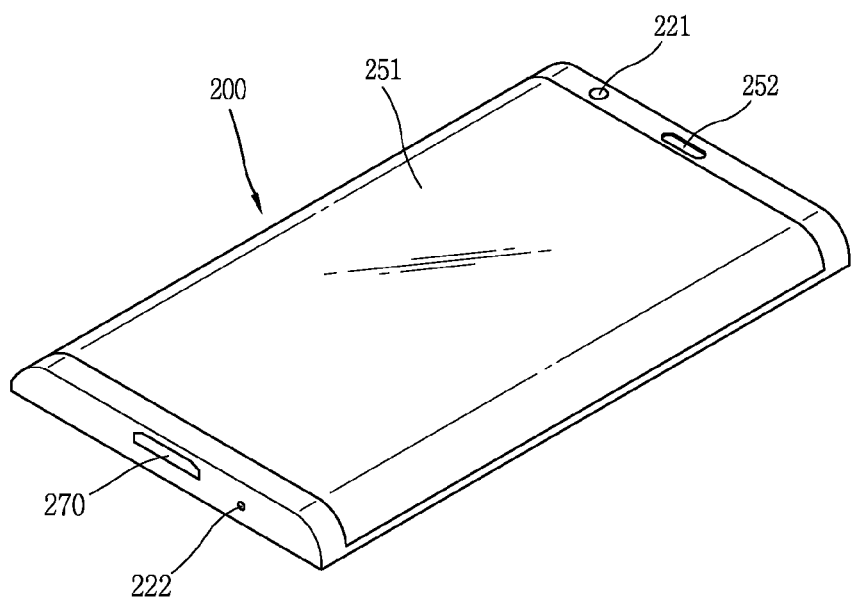
FIG. 3A is a front perspective view illustrating an embodiment of a mobile terminal according to the present invention.
Figure 3B:
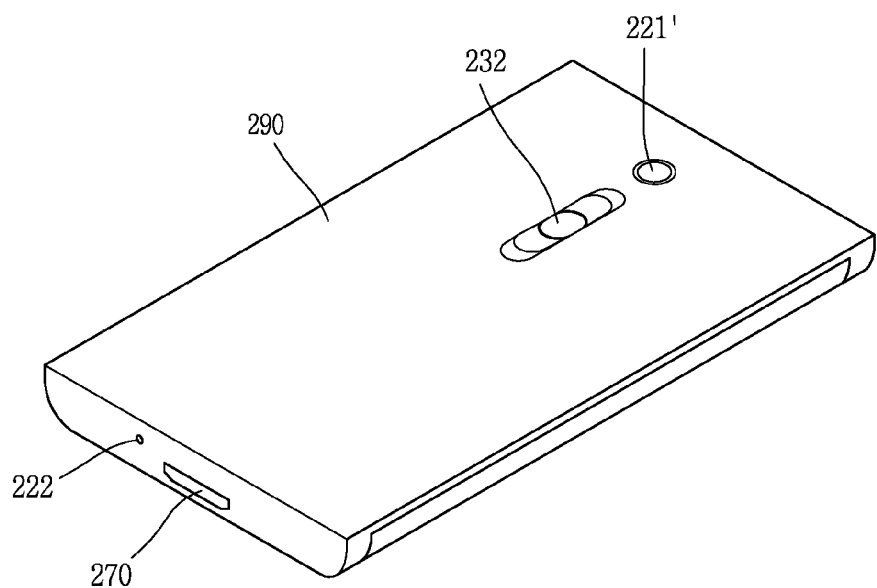
FIG. 3B is a rear perspective view of the mobile terminal of FIG. 3A.

Hereinafter, a hardware configuration of the mobile terminal which performs the operation of FIG. 2 will be explained in more detail. FIG. 3A is a front perspective view illustrating an embodiment of a mobile terminal according to the present invention, and FIG. 3B is a rear perspective view of the mobile terminal of FIG. 3A.

The mobile terminal 200 according to the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 200 comprises a case (casing, housing, cover, etc.). In this embodiment, the case may be divided into a front case 201 and a rear case 202 (refer to FIGS. 3a and 3b). A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

A display unit 251, an audio output module 252, a camera module 221, etc. may be disposed at the front body, mainly at the front case 201. An interface 270, etc. may be disposed on side surfaces of the front case 201 and the rear case 202. The display unit 251 occupies most of a main surface of the front case 201.

That is, the display unit 251 is disposed on the front surface of the mobile terminal, and is configured to display visual information. In the present invention, the display unit 251 is formed on the side surfaces as well as on the front surface. More specifically, the display unit 251 is provided with a first region 252 arranged on the front surface of the body, and a second region 253 extending from the first region 252 and arranged on the side surfaces of the body.

For instance, a window arranged on an upper surface of the display unit 251 has its two side surfaces bent. Under such configuration, the appearance of the front surface and the side surfaces of the body is determined by the window. The first region 252 and the second region 253 may be connected to each other without a boundary therebetween. In this case, the display unit 251 may be provided with a display bent and mounted in the mobile terminal in correspondence to the window.

As another example, the display unit 251 may be a flexible display. The flexible display includes a display bent, twisted, folded and rolled up by an external force. The flexible display may include a general flexible display and electronic paper.

The general flexible display indicate a light-weighted and unbreakable display fabricated on a thin and flexible substrate which can be bent or folded like paper, while maintaining characteristics of the conventional flat display.

Electronic paper is a display technique using characteristics of general ink, which may be different from a general flat display in that reflected light is used. The electronic paper may change images or texts by twisting balls, or an electrophoresis using capsules.

The body, where two side surfaces of the display unit are bent, can be implemented by the flexible characteristics.

The audio output unit 252 and the camera module 221 may be disposed at a region adjacent to one end of the display unit 251, and a front user input unit (not shown) and a microphone 222 may be disposed at a region adjacent to another end of the display unit 251.

The front user input unit, an example of the user input unit 130 (refer to FIG. 1) may include a plurality of manipulation units. The manipulation units may be referred to as manipulating portions, and may include any type of manipulation units that can be manipulated by a user in a tactile manner.

The display unit 251 may form a touch screen together with a touch sensor. In this case, the touch screen may be implemented as a user input unit. Under such configuration, a front user input unit may not be provided on the front surface of the mobile terminal. In this case, the mobile terminal may be configured so that an input to the body can be performed only through the display unit 251 and a rear user input unit 232 to be explained later.

Referring to FIG. 3b, a camera module 221' may be additionally provided on the rear case 202. The camera module 221' faces a direction which is opposite to a direction faced by the camera module 221 (refer to FIG. 3a), and may have different pixels from those of the camera module 221.

For example, the camera module 221 may operate with relatively lower pixels (lower resolution). Thus, the camera module 221 may be useful when a user can capture his face and send it to another party during a video call or the like. On the other hand, the camera module 221' may operate with a relatively higher pixels (higher resolution) such that it can be useful for a user to obtain higher quality pictures for later use. The camera modules 221 and 221' may be installed at the body so as to rotate or pop-up.

A flash and a mirror may be additionally disposed close to the camera module 221'. The flash operates in conjunction with the camera module 221' when taking a picture using the camera module 221'. The mirror can cooperate with the camera module 221' to allow a user to photograph himself in a self-portrait mode.

An audio output unit (not shown) may be additionally arranged on a rear surface of the body. The audio output unit disposed on the rear surface of the body may implement a stereo function, together with the audio output unit 252 (refer to FIG. 3a) disposed on the front surface of the body. And the audio output unit disposed on the rear surface of the body may be configured to operate as a speakerphone during a call.

That is, a first audio output unit 252 configured as a receiver may be formed on the front surface, and a second audio output unit configured as a speaker may be formed on the rear surface. However, the present invention is not limited to this. That is, the second audio output unit may be provided on a side surface of the mobile terminal.

A power supply unit 290 for supplying power to the mobile terminal 200 is mounted to the body. The power supply unit 290 may be mounted in the body, or may be detachably mounted to the body.

A rear user input unit 232 may be disposed on the rear surface of the body. The rear user input unit 232 may be disposed below the camera module 221'.

The rear user input unit 232 is manipulated to input various commands for controlling the operation of the mobile terminal 200. For instance, the rear user input unit 232 is configured to input commands such as POWER ON/OFF, START, END and SCROLL, commands for controlling a level of sound outputted from the audio output module 252, or commands for converting the current mode of the display unit 251 to a touch recognition mode. However, the present invention is not limited to this. That is, the mobile terminal may be provided with only one of the front user input unit and the rear user input unit 232.

As aforementioned, the controller 180 can generate a control signal related to an event generated from an application, using the side surfaces of the display unit.

Figure 4:
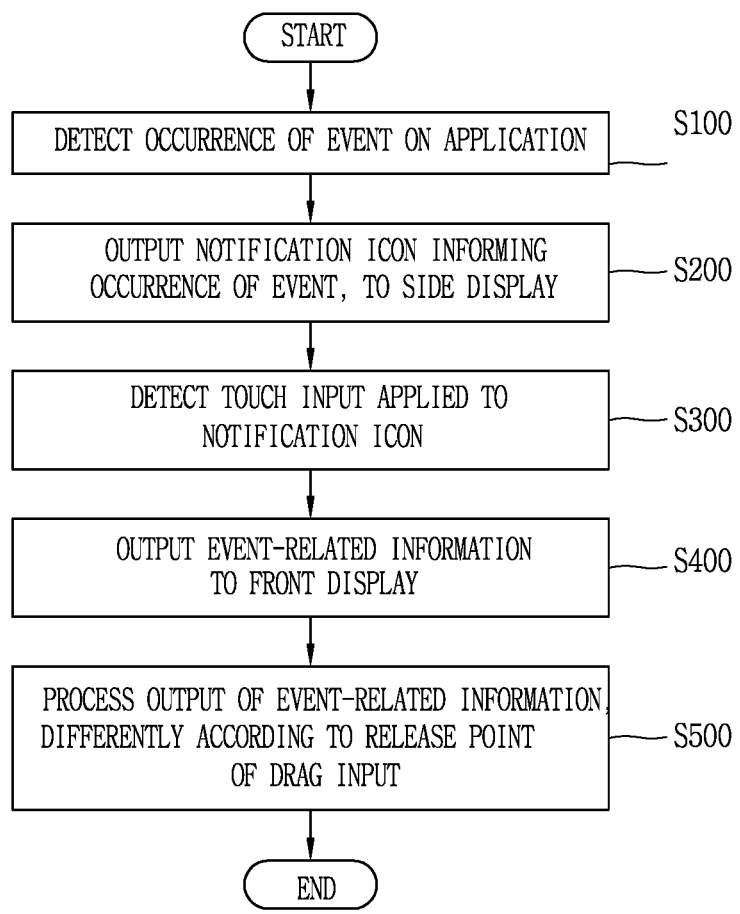
FIG. 4 is a flowchart illustrating a method for controlling a mobile terminal according to the present invention.

Hereinafter, will be explained a method for controlling a mobile terminal, capable of outputting event-related information and controlling functions of the mobile terminal, through combination of the front surface and the side surfaces of the display unit. FIG. 4 is a flowchart illustrating a method for controlling a mobile terminal according to the present invention.

Firstly, the controller detects that an event has occurred from at least one application (S100).

The application means all types of programs which can operate in the mobile terminal, which comprises a concept of a widget, a home launcher, etc. Therefore, the application may be a program which performs web browsing, reproduction of moving images, transmission/reception of messages, schedule management and application update.

An event may occur in a case where there is a missed call, there is an application to be updated, there is an incoming message, a charging operation is performed, power of the mobile terminal is turned on or off, or an LCD awake key is pressed (LCD awake key). The event may be an alarm, an Incoming call, a missed notification, etc.

As another example, in a case where specific information is received through the wireless communication unit of the mobile terminal, this means occurrence of an event on an application related to the specific information. In this case, the controller senses the occurrence of the event. In a case where a user has input an item on a schedule management application, if the current date corresponds to the item, an event occurs.

Then, the controller outputs a notification icon indicating occurrence of an event, to the side surfaces of the display unit (S200).

The display unit of the mobile terminal may be divided into a first region arranged on the front surface of the body, and a second region extending from the first region and arranged on the side surfaces of the body. The side display corresponds to the second region. The second region is provided with a left region and a right region disposed on a left side surface and a right side surface of the mobile terminal, respectively. The notification icon is output to at least one of the left region and the right region.

The notification icon 261 may be a bar type image displayed along the side surface of the mobile terminal, and may include different images according to a type of an event-occurred application. As another example, the notification icon 261 may include different images according to an event type, or according to the amount of event-related information. The different images indicate images different from each other in shape, length, color, etc.

Then, the controller senses a touch input applied to the notification icon 261 (S300). To this end, the second region is configured as a touch screen.

In response to the touch input, the controller outputs information related to the event to the front display (first region) (S400). For instance, the event may be reception of messages, and the information may be content of a message. Alternatively, the event may be a notification of a schedule set in a schedule management application, and the information may be detailed information of a set schedule. Still alternatively, the event may be occurrence of an application to be updated, and the information may be detailed information of an application to be updated.

In this case, a different control may be performed according to a type of the touch input. For instance, if a short-touch input is applied to the notification icon, a message may be updated. On the other hand, if a long-touch input is applied to the notification icon, the notification icon may be deleted. In this embodiment, if a drag input is applied to the notification icon, the event-related information is displayed on the first region.

Then, the controller processes output of the event-related information differently according to a release point of a drag input (S500).

For instance, an image, of which size is gradually changed according to a path of the drag input, is generated at the first region. The information is displayed within the image. And the image is differently processed according to a release point of the drag input. The image may be a status bar, or a screen for executing a specific function (e.g., connection of a call signal).

More specifically, if the drag input is released within the first region, the image and the information may disappear from the display unit. On the other hand, if the drag input is released on the right region after being connected to the right region from the left region, the image and the information are continuously output.

In a state where the output of the image and the information is maintained, a new control command may be performed according to a touch input. For instance, information to be output may be changed according to a flicking input applied to the image. The information to be output may correspond to events which have occurred sequentially, respectively.

The method for controlling a mobile terminal according to the present invention may be embodied in various manners as shown in FIGS. 5 to 13. In the following embodiment, components having the same or similar configuration as/to those of the aforementioned embodiment will be provided with the same or similar reference numerals, and explanations thereof will be omitted.

FIGS. 5 to 9 are conceptual views illustrating operations implemented by the mobile terminal of FIG. 3A, in which a status bar is controlled using a touch to input applied to a side display.

Figure 5:
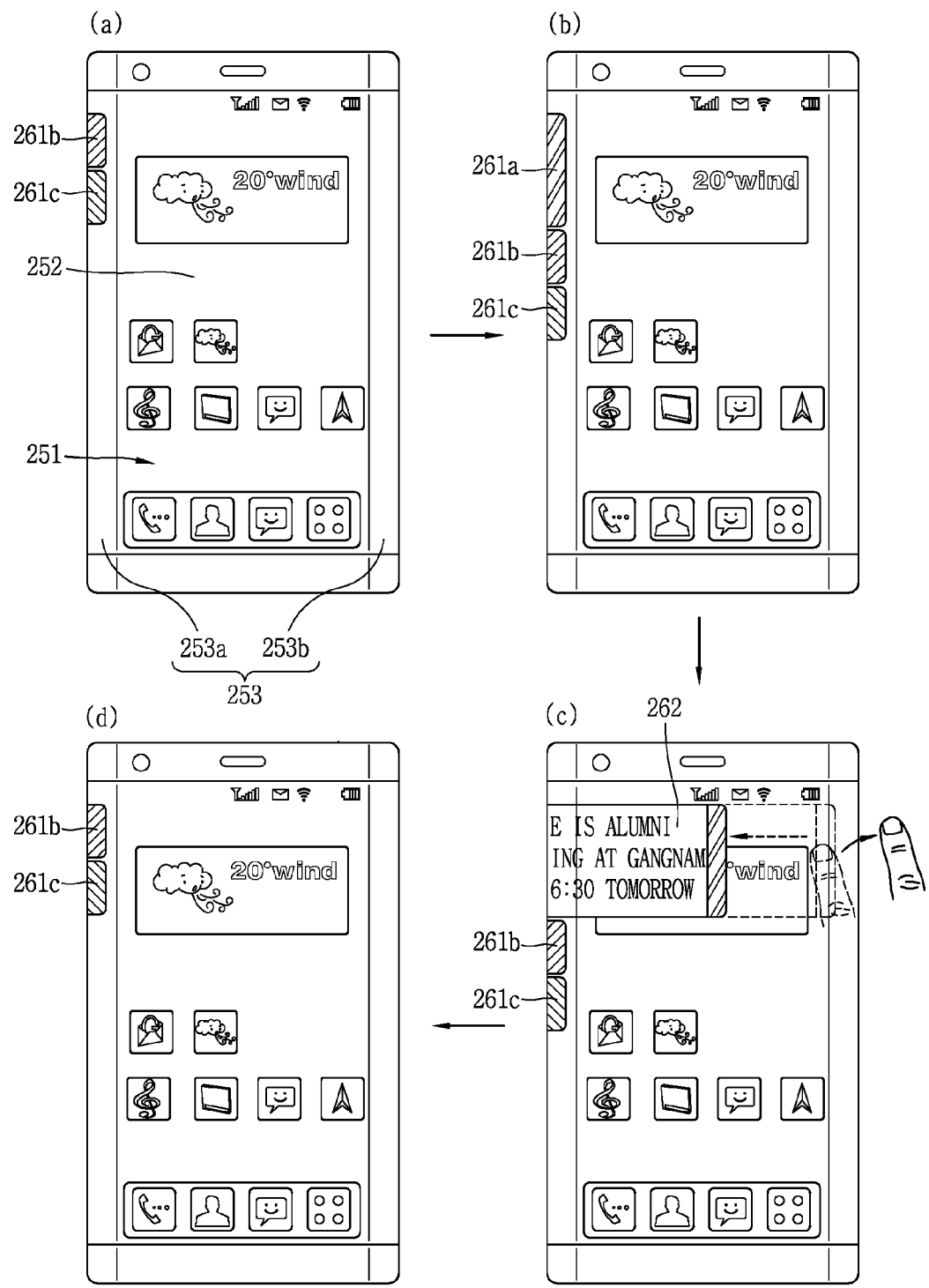
FIGS. 5 to 9 are conceptual views illustrating operations implemented by the mobile terminal of FIG. 3A, in which a status bar is controlled using a touch input applied to a side display.

Referring to FIG. 5, notification icons may be generated in the order of occurrence of events, and may disappear after being checked by a user.

More specifically, referring to FIG. 5(a), when events have occurred on applications, notification icons informing the occurrence of the events are sequentially output in the order of occurrence of events. As an example, a first notification icon 261a, a second notification icon 261b and a third notification icon 261c are arranged in a lengthwise direction of the mobile terminal.

In this case, each notification icon may be an icon which represents a category. For instance, the first notification icon 261a may be an icon corresponding to a category related to message reception, and the second notification icon 261b may be an icon corresponding to a category related to schedule management. And the third notification icon 261c may be an icon corresponding to a category related to application update. As messages are assorted by category, a user can view notifications of only desired applications at one time.

If there is an incoming message in a state where the second notification icon 261b and the third notification icon 261c have been output to the second region 253, the first notification icon 261a indicating an incoming message is output to the second region 253. In this case, as shown in FIG. 5(b), the second notification icon 261b and the third notification icon 261c move downward in a lengthwise direction of the mobile terminal. That is, the notification icon disposed on the uppermost side of the mobile terminal informs a recently-occurred event.

In this embodiment, can be solved the conventional problem that an application should be executed in order to check the previous notification because a new notification has covered the previous notification.

However, the present invention is not limited to this. As another example, the first notification icon 261a, the second notification icon 261b and the third notification icon 261c may be output to preset positions in the order of occurrence of events.

As shown in FIG. 5(c), if a user applies a drag input to the first notification icon 261a to check event-related information displayed in an image 262, and then if the user releases the drag input, the first notification icon 261a disappears as shown FIG. 5(d). In this case, the image 262 may be a status bar.

Positions of the second notification icon 261b and the third notification icon 261c are determined as the second notification icon 261b associated with the recent icon moves toward the uppermost side of the mobile terminal. That is, the second notification icon 261b is arranged on the uppermost side of the mobile terminal, and the third notification icon 261c is arranged below the second notification icon 261b.

Figure 6:
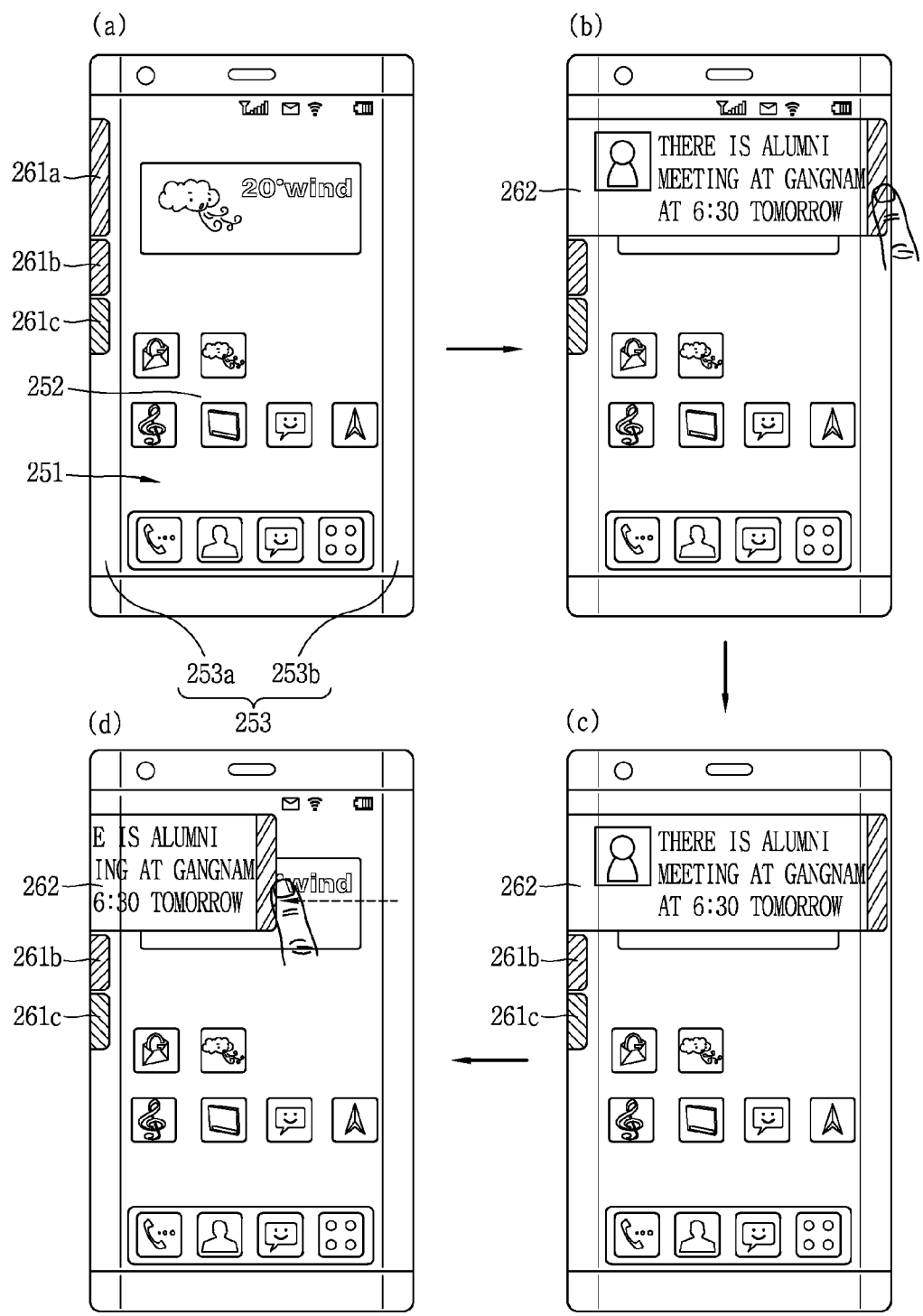

As another example, as shown in FIG. 6, as a release point of a drag input is changed, event-related information may not disappear but may be continuously output to the screen.

For instance, if a drag input is connected from one of the left region 253a and the right region 253b to another, a boundary of the image is fixed to said another region. In a state where the boundary of the image is fixed, information displayed within the image is controlled using a touch input applied to the image.

More specifically, in a state where the notification icon has been output (refer to FIG. 6(a)), if a drag input is connected from the left region 253a to the right region 253b and then is released on the right region 253b as shown in FIGS. 6(b) and (c), output of an image and information (message content in the status bar in this embodiment) is maintained. That is, the status bar covers a display region between the left region 253a and the right region 253b in a widthwise direction of the mobile terminal. And the notification icon 261 moves from the left region 253a to the right region 253b to thus be positioned on the right region 253b.

That is, if a drag input is performed up to the end of the screen, a message does not disappear. Under such configuration, a sticker function, by which a user can use a related application in a state where the status bar is fixed, can be implemented.

The sticker function may be released by a drag input performed in another direction as shown in FIG. 6(d). For instance, if a user applies a drag input from the right region 253b to the left region 253a, the status bar moves toward the left region 253a to thus gradually disappear. However, the present invention is not limited to this. For instance, the sticker function may be released by other touch input, e.g., a consecutive touch input, etc.

Figure 7:
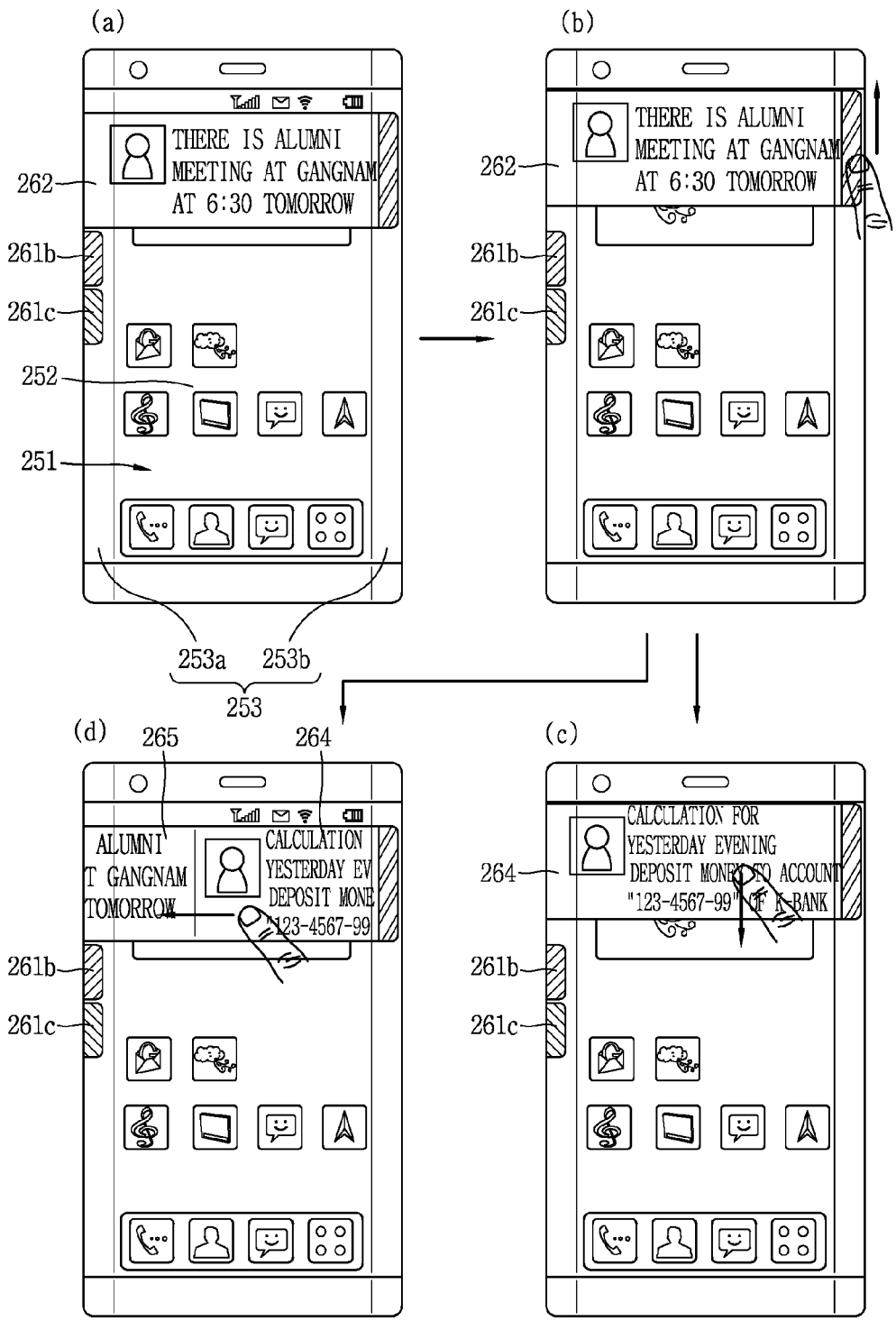

The sticker function may be utilized as various control methods, which will be explained in more detail. FIGS. 7 to 9 are conceptual views illustrating various examples of a sticker function.

Referring to FIGS. 7(a) and (b), in a state where output of an image and information (message content in the status bar in this embodiment) is maintained, the image and the information are moved by a user's up-down drag applied to the notification icon.

That is, the image is moved by a drag input applied to the notification icon in a direction perpendicular to the drag input for unfolding the image. In this case, the rest notification icons move along the image. A point where the user's drag input is released is a final position of the image in upper and lower directions.

Referring to FIG. 7(c), if a flicking input is applied up and down in a state where the status bar has been fixed to the screen, a full message can be checked in a scrolling manner. In this case, the image 262 for outputting the first message is changed into an image 264 for outputting a second message.

As another example, a scroll bar may be created, or the length of an image may be controlled by a drag input. The length of the notification icon may be variable according to the amount of the event-related information.

For instance, if event-related information is displayed on the first region 252, a scroll bar for moving the displayed information up and down may be generated on at least part of the second region 253.

Under such configuration, a user can check all contents even if a mark "READ" is not displayed on a messenger application. Referring to FIG. 7(b), after an image is moved up and down, a flicking input is performed. However, the present invention is not limited to this. For instance, the operation to move an image up and down shown in FIG. 7(b) can be deleted in this embodiment. The operation to move an image up and down, the scrolling, etc. may be a control operation added to the aforementioned embodiment or the following embodiment.

As shown in FIG. 7(d), a scrolling operation in right and left directions can be performed. In this case, if a user applies a flicking operation right and left in a state where the status bar has been fixed to the screen, received messages may be output sequentially. Under such configuration, a user can check previous messages. In this case, the image 264 for outputting the second message may be changed into an image 265 for outputting a third message has been output.

Figure 8A:
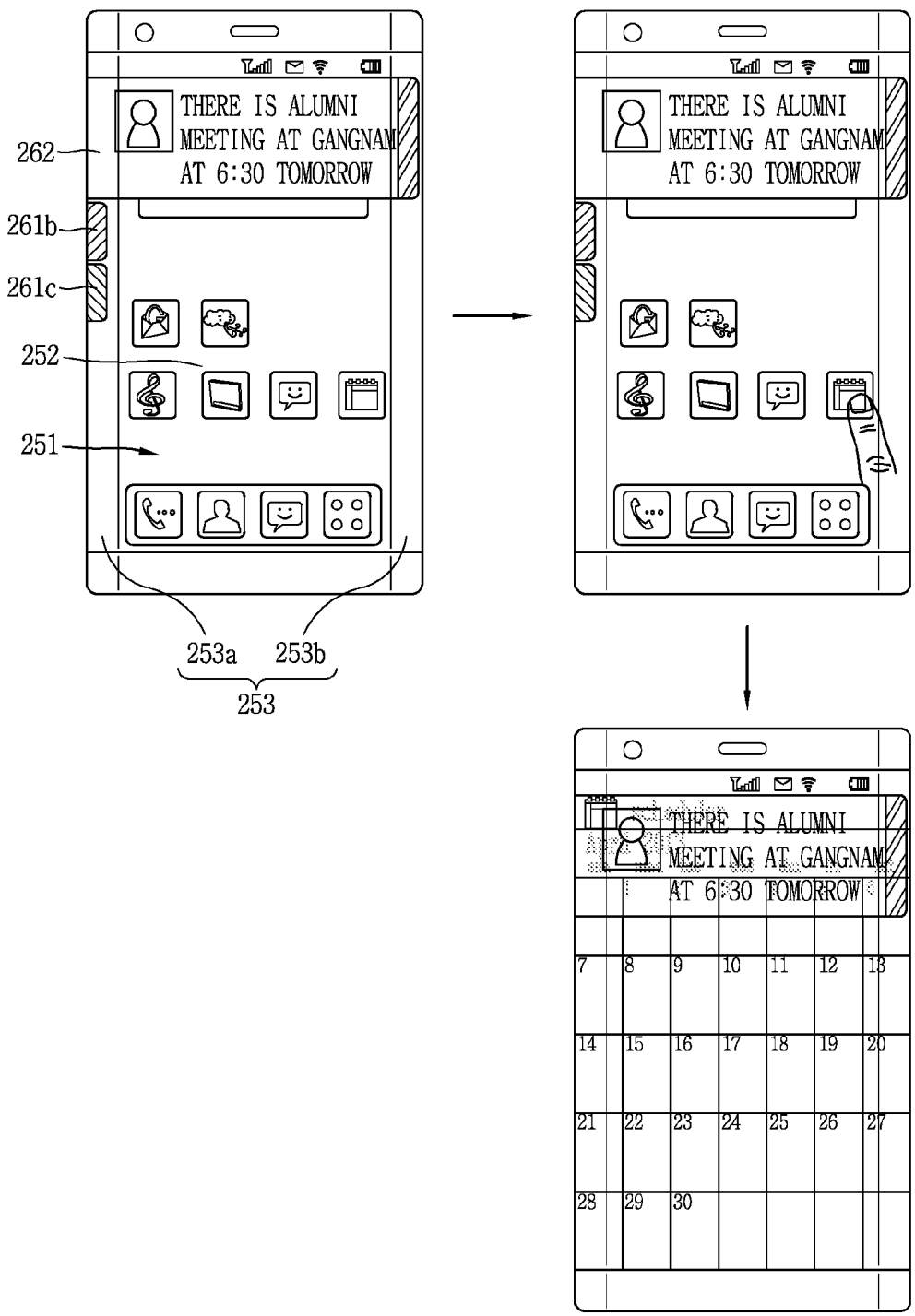
Figure 8B:
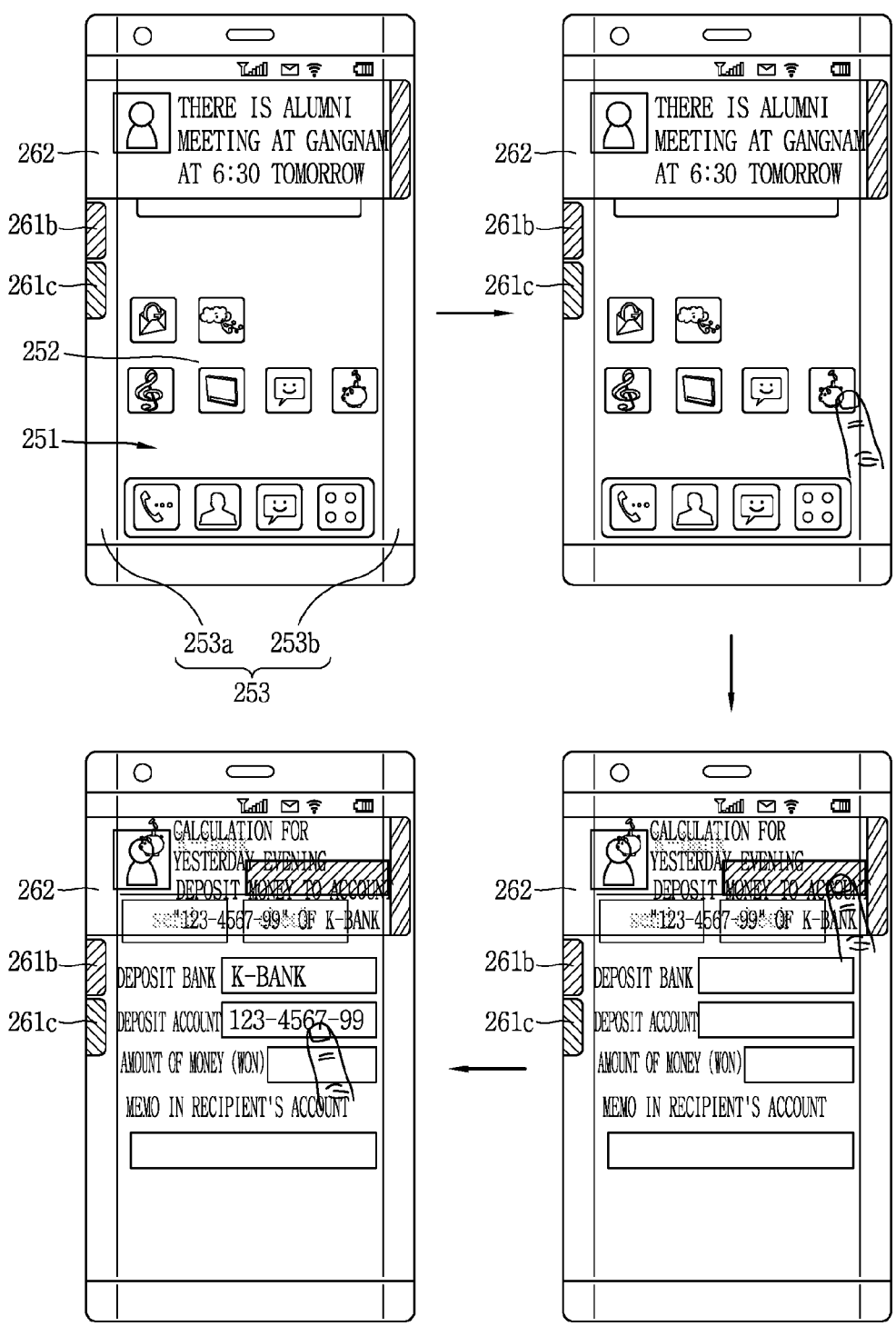
Figure 9:
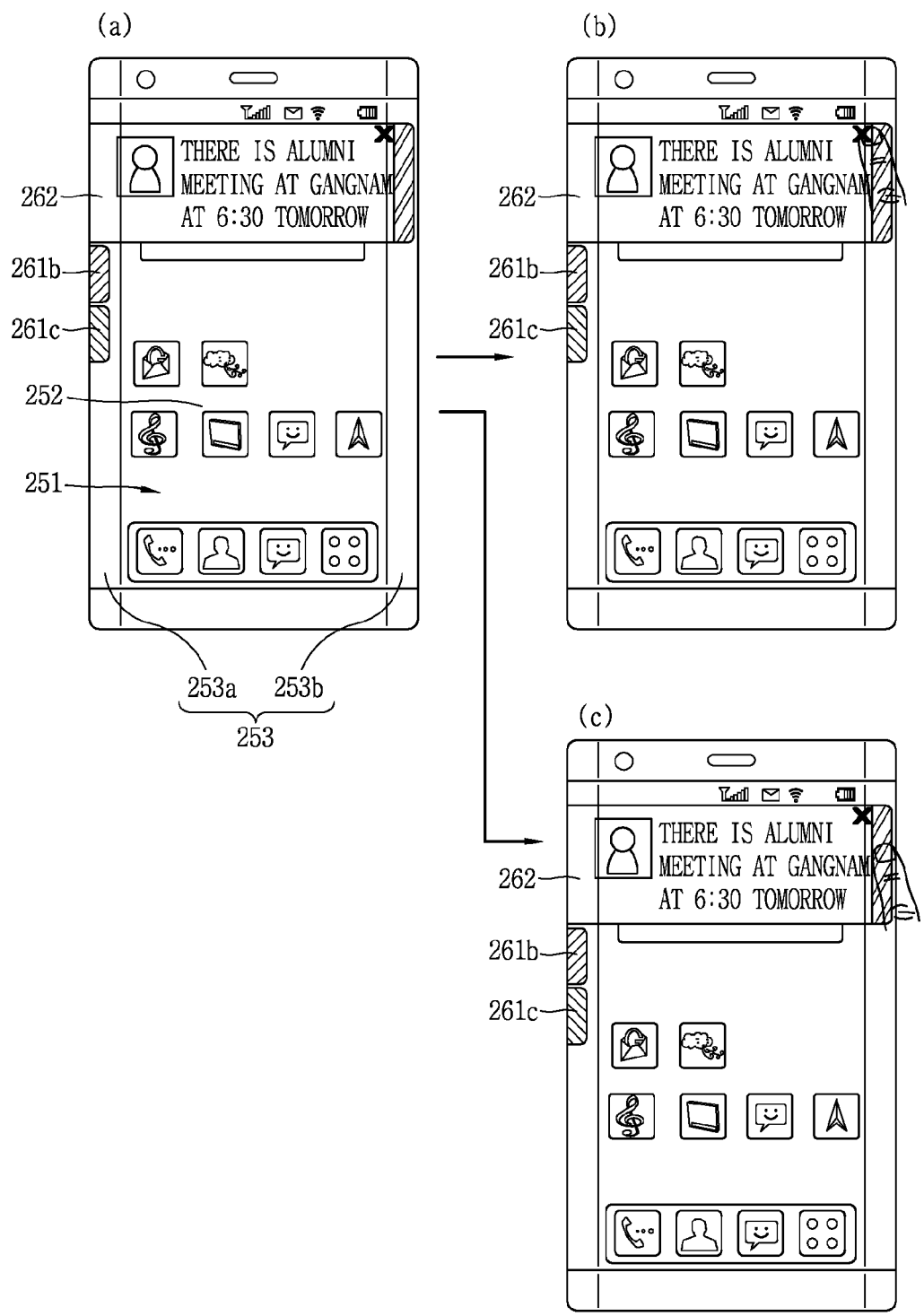

Referring to FIGS. 8A and 8B, a lower screen can be utilized when a sticker function is executed.

For instance, the first region 252 is divided into a first part and a second part. Information on the event is displayed on the first part, and a screen output to the first region 252 before the touch input is applied is continuously displayed on the second part. If an application different from an event-occurred application is driven in a state where the event-related information is displayed on the first part, an execution screen for the different application may be output to the second part. The controller senses a control command related to the information displayed on the first part, using a touch input applied to the second region 253.

More specifically, as shown in FIG. 8A, a lower screen is configured so that a touch input can be executed in a state where an image has been fixed. In this state, if a user touches an icon of an application on a home screen page, the application is executed.

FIG. 8A illustrates a case where a schedule management application is executed. As a schedule management application is executed, an execution screen is output to the lower screen in a state where an image has been fixed. More specifically, in a case where a schedule is included in message content, if a user touches an icon of a schedule management application for driving, the schedule can be input to the execution screen. In this case, the image is a transparent image, and the execution screen is overlapped with the image. Even if part of the execution screen for the schedule management application is viewed, a touch input with respect to the image may be defined as a control command with respect to the image.

As another example, a result of a control command with respect to the image may be used to control the execution screen. Referring to FIG. 8B, in a state where the image has been fixed, a mobile banking is driven, and content may be input to an execution screen of an application based on information output to the image. More specifically, at least part of output information may be copied by a user's touch input. For instance, if a user applies a long-touch input to an output text or number, the text or number is copied. Then, if the user applies a long-touch input to an execution screen, a paste function is performed. The long-touch input may be performed on an activated part of the execution screen.

Under such configuration, a copy-paste function can be performed between the status bar and the main screen. Further, in a case where a user performs other operation with viewing a message, the current application needs not be converted, and a text, an image, etc. of the status bar can be immediately moved to the execution screen of the application.

FIG. 9 is a view showing another control method of a mobile terminal, in which messages are managed at one time by category.

As shown in FIG. 9(a), if a user drags a notification icon up to the end of the screen, the status bar is fixed to the screen without disappearing. In this case, a mark 'X' is generated. If the mark 'X' is touched, a specific message is deleted. More specifically, when an image is fixed to the screen, a specific icon is generated. If a touch input is applied to the specific icon, a corresponding message is deleted. In this case, the image is continuously fixed to the screen, and the next message is output.

As another example, if the right region 253b is double-tapped, all of accumulated messages disappear. More specifically, a consecutive touch is applied to a notification icon of the right region 253b, all of accumulated messages disappear. In this case, a user can delete all of messages at one time by category.

However, the present invention is not limited to this. For instance, specific notifications such as application update notifications may be deleted at one time. More specifically, messages may be deleted one by one, whereas application update notifications may be deleted at one time. In this case, a deletion command may be a double tap on the right region 253b, or a touch input to a specific icon.

The side display of the present invention can be effectively used even in a case where specific information has been received through a wireless communication unit. This will be explained in more detail. FIGS. 10 to 13 are conceptual views illustrating various embodiments related to reception of information.

Figure 10:
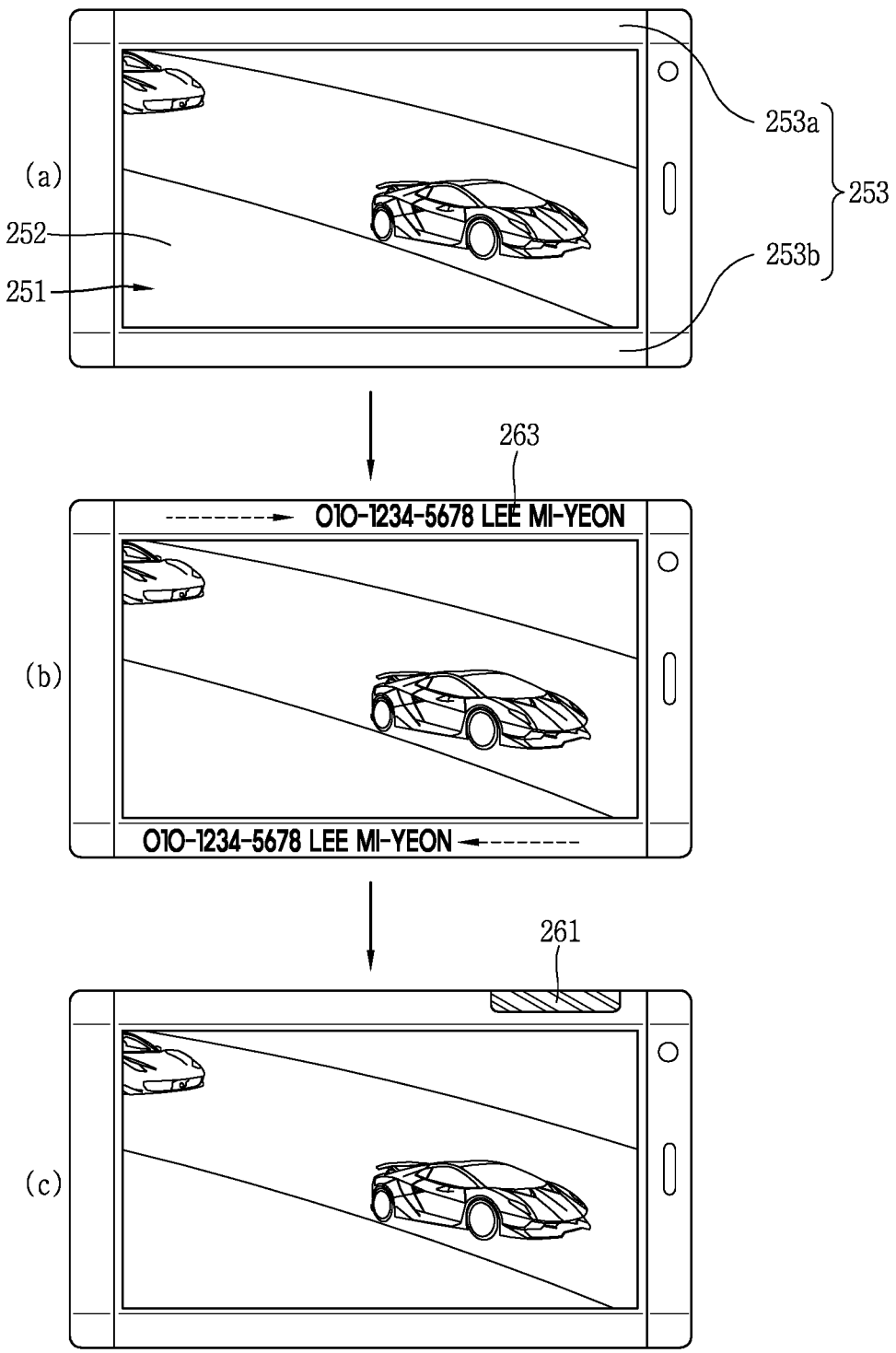

FIG. 10 is a conceptual view illustrating a driving of a side display when a call signal is received.

Referring to FIG. 10, if a call signal is received while an application is driven, information on the call signal is displayed on the second region 253. More specifically, referring to FIG. 10(a), if an application related to reproduction of moving images is executed, an execution screen related to reproduction of moving images is output to the first region 252 and the second region 253.

If a call signal is received under such state, an indicator 263 informing reception of the call signal is output to the second region 253 as shown in FIG. 10(b). The indicator 263 may be information on another party's mobile terminal which has transmitted the call signal, e.g., a phone number or another party's name.

The indicator 263 moves within the second region 253 while the call signal is received, and disappears when a notification icon is generated.

For instance, information on another party's mobile terminal is displayed on the second region 253 in a scrolling manner. The information on another party's mobile terminal may be displayed with moving toward a lower side from an upper side of the screen, or toward an upper side from a lower side of the screen.

The display by scrolling may be consecutive from the left region 253a to the right region 253b. For instance, information on another party's mobile terminal may be scrolled on the left region 253a, toward a lower side from an upper side of the screen. Then, the information may be scrolled on the right region 253b, toward an upper side from a lower side of the screen.

As shown in FIG. 10(c), if a user does not respond to a call signal, a notification icon 261 informing a missed call is output to the second region 253. Under such configuration, the user can recognize a missed call.

If a drag input is applied to the notification icon 261, a status bar may be output to the first region 252 like in the aforementioned embodiment, and information on another party's mobile terminal may be output to the status bar.

Figure 11:
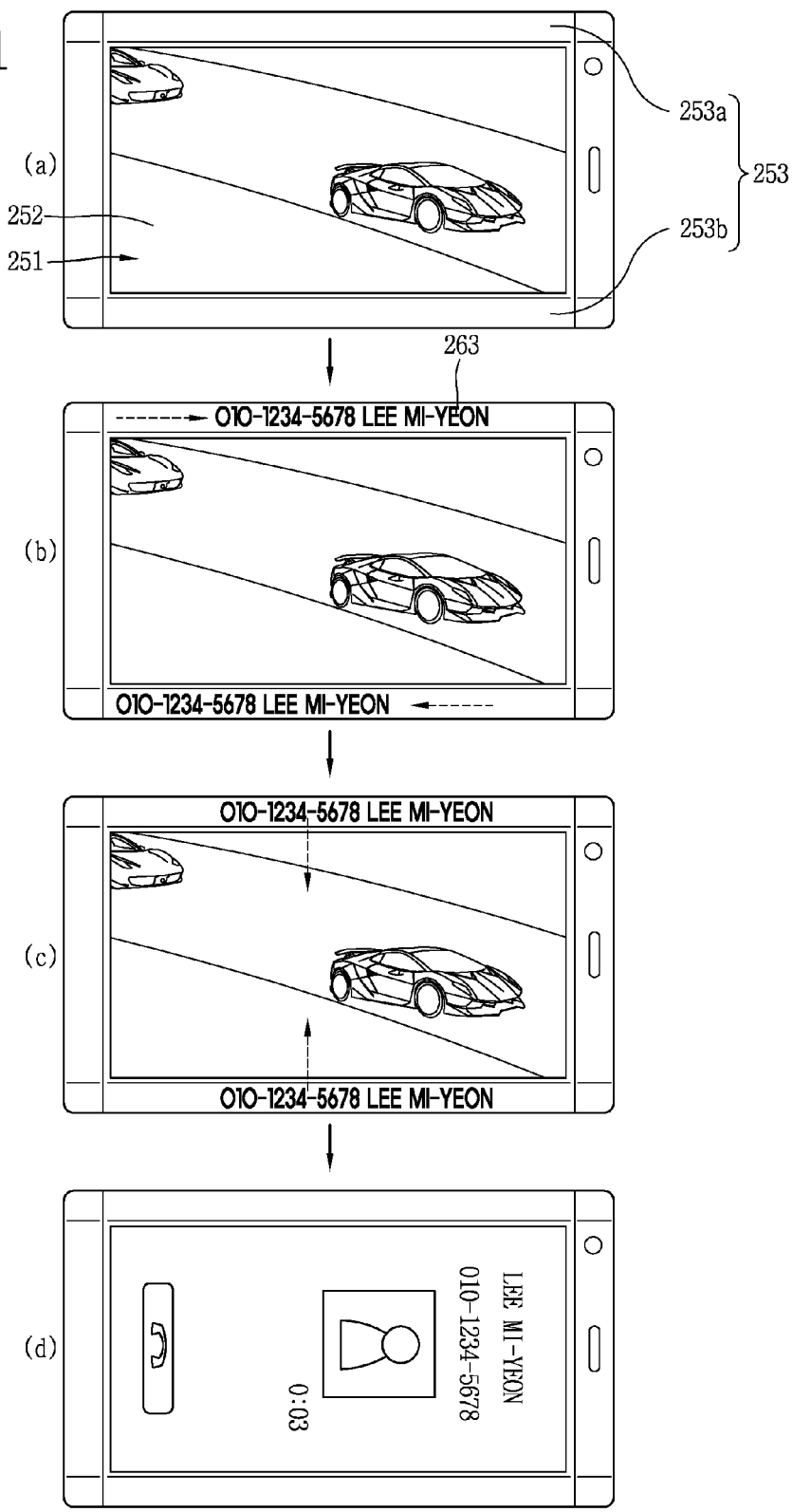

Referring to FIG. 11, if a touch input to the second region 253 is detected while the indicator 263 is output, the controller performs a control related to an incoming call.

While information on another party's mobile terminal is scrolled to the second region 253 as shown in FIG. 11(b), if a drag input or a flicking input is applied to the second region 253 in one direction as shown in FIGS. 11(c) and (d), an incoming call may be connected. At the same time, an execution screen for connection to the incoming call may be output to the first region 252.

As another example, if a drag input or a flicking input is applied to the second region 253 in another direction, a control command instructing a connection refusal (i.e., call disconnection) is input. Information is output to the second region 253, and a call connection or a call disconnection is performed according to a direction of a touch input applied to the second region 253. Under such configuration, a user can determine whether to receive a call or not while performing the current operation.

In this embodiment, if there is an incoming call while a user manipulates his or her smart phone, the user can check the incoming call through a side display. The user can perform a call connection or a call disconnection through flicking in or flicking out.

In the present invention, even in a state where the mobile terminal is turned inside out, a call refusal (call disconnection) may be easily performed. This will be explained in more detail with reference to FIG. 12.

In this embodiment, the display unit is operated differently according to whether the mobile terminal is in a first state, a second state or a third state.

The first state indicates a state where the front surface of the mobile terminal is toward the upper side, and the second state indicates a state where the rear surface of the mobile terminal is toward the upper side. On the other hand, the third state indicates a state where the body of the mobile terminal is covered by an additional case (pouch), etc.

The determination, on whether the mobile terminal is in the first state, the second state or the third state, may be performed through combination of at least two of a proximity sensor, an illumination sensor and a gyro sensor.

FIG. 12 shows operations of the mobile terminal in the second state and the third state. In a state where the front surface of the mobile terminal is covered by another object and the display unit is deactivated, if a call signal is received through the wireless communication unit, the deactivated state of the display unit is maintained. At the same time, the indicator 263 informing reception of the call signal is output to the second region 253.

The indicator may be information on another party's mobile terminal, or lighting information. Under such configuration, if there is an incoming call in a state where the mobile terminal is turned inside out, a user can check the incoming call through a side display.

If a user applies a touch input to the second region 253, a control command instructing a connection refusal (call disconnection) is input. The touch input may be a long-touch input, a short-touch input, a flicking input, a drag input, etc. In case of a drag input, a control command instructing a call connection or a call refusal may be performed according to a direction of the drag input.

Figure 13:
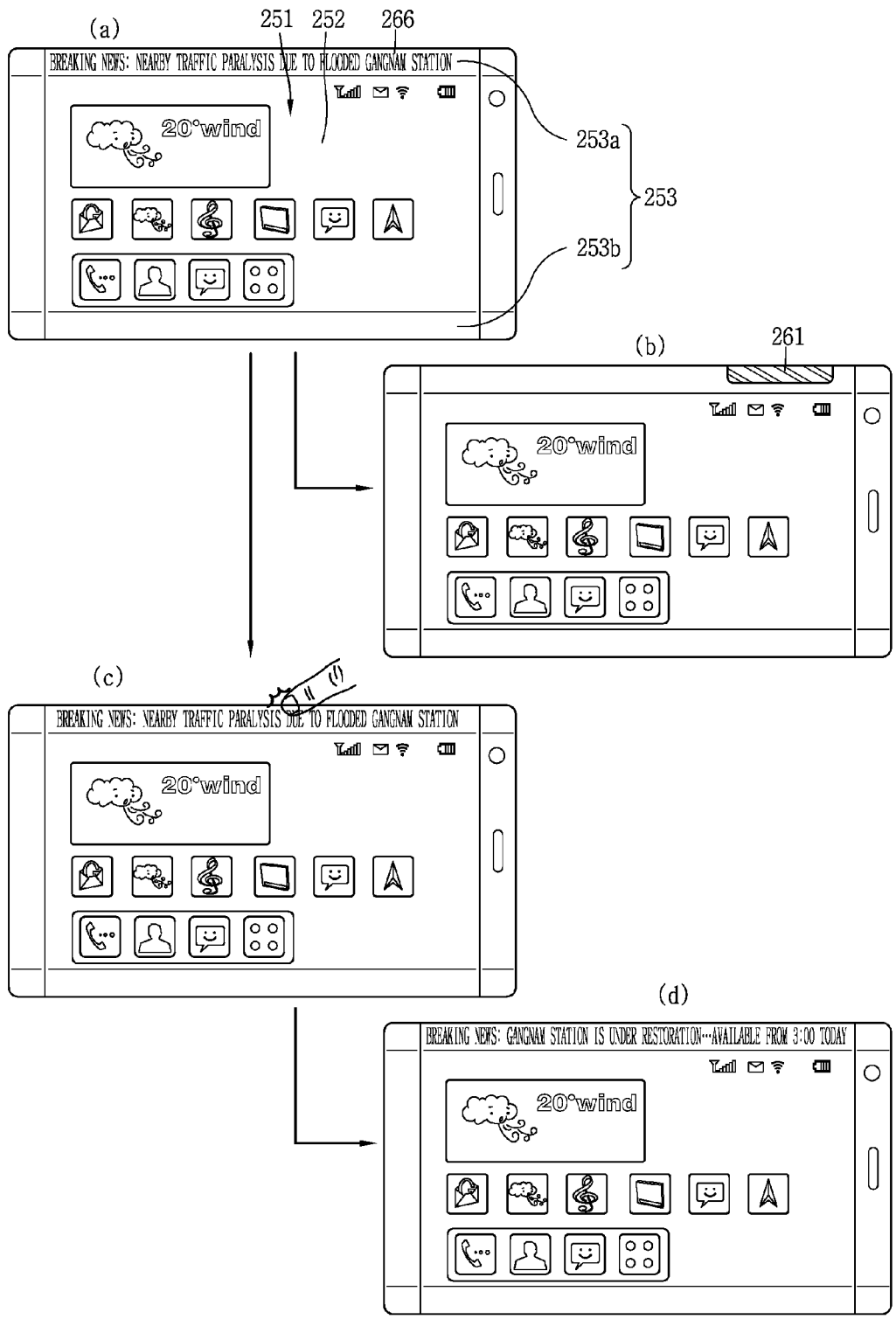

In the present invention, a function to view recent information without influencing on the main screen can be performed. FIG. 13 is a conceptual view illustrating such function.

Referring to FIG. 13(a), in a case where the front surface of the mobile terminal is covered by a pouch, the controller senses the covered state. If information 266 is received through the wireless communication unit under such state, at least part of the received information 266 is output to the second region 253. If a control command has not been input by a user, the received information 266 disappears and a notification icon 261 is output like in the aforementioned embodiment.

If a control command for activating the display unit is input in a state where the second region 253 has been touched, the controller may display the received information on the first region 252. For instance, if the pouch is open in a state where the second region 253 has been touched, the mobile terminal senses the open state to thus display the received information on the first region 252.

Referring to FIG. 13(b), upon detection of touch inputs consecutively applied to the second region 253 with time intervals, the controller updates information output to the second region 253.

More specifically, information such as a news and a weather is output to a side display, and the information is updated to recent information whenever the side display is tapped. That is, widgets such as a news and a weather, which need to be updated periodically, are displayed on the side surfaces. If the side surfaces are tapped for update, new information can be displayed without influencing on the main screen.

The present invention can have the following advantages.

Firstly, as the front display and the side display interwork with each other, a new type of user interface can be provided.

Secondly, as an operation to notify occurrence of an event or an operation to output detailed information is controlled using the side display of the mobile terminal, information can be provided to a user regardless of a status of the mobile terminal.

Thirdly, information on an occurred event can be provided in various manners, even in a deactivated state of the front display.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed:

1. A mobile terminal, comprising:
   a wireless communication unit configured to provide wireless communication;
   a touch screen having a front surface and a curved surface extending from the front surface of the touch screen; and
   a controller configured to:
   display an indicator informing an incoming call on the touch screen in response to receiving the incoming call,
   connect a call related to the incoming call, in response to an input for connecting the call related to the incoming call during displaying of the indicator informing the incoming call on the touch screen,
   display a first notification icon informing a missed call related to the incoming call at a first preset location on the curved surface of the touch screen if the input for connecting the call related to the incoming call is not received, wherein the first notification icon is displayed after the indicator disappears from the touch screen,
   only display a first image including information related to the missed call on the touch screen in response to a first touch and drag from the first notification icon on the curved surface of the touch screen to the front surface of the touch screen, wherein the information related to the missed call includes at least one of a phone number or a name of a counterpart, and
   display an initial notification icon indicating a schedule management before the first notification is displayed,
   wherein the initial notification icon is displayed together with the first notification icon,
   wherein the initial notification icon and the first notification icon include a bar type image displayed on the curved surface of the touch screen and extending along the curved surface of the touch screen, and
   wherein a display length of the initial notification icon is different than a display length of the first notification icon.

2. The mobile terminal of claim 1, wherein if the front surface of the touch screen is covered, the indicator is displayed on the curved surface of the touch screen in response to receiving the incoming call.

3. The mobile terminal of claim 2, wherein at least part of the front surface of the touch screen is deactivated while the front surface of the touch screen is covered and the indicator is displayed on the curved surface of the touch screen.

4. The mobile terminal of claim 3, wherein the deactivated state of the front surface of the touch screen is maintained while the incoming call is received and the front surface of the touch screen is covered.

5. The mobile terminal of claim 2, wherein the indicator comprises information related to the counterpart.

6. The mobile terminal of claim 2, wherein the indicator moves within the curved surface while the incoming call is received.

7. The mobile terminal of claim 2, wherein the indicator includes a light.

8. The mobile terminal of claim 1, wherein the first image is displayed on the front surface of the touch screen at a location corresponding to the first notification icon on the curved surface.

9. The mobile terminal of claim 1, wherein the controller is further configured to:
sense an occurrence of a second event, and
display a second notification icon informing the second event at second preset location on the curved surface of the touch screen,
wherein the first notification icon and the second notification icon are displayed together on the curved surface of the touch screen while a home screen page is displayed on the front and curved surfaces of the touch screen.

10. The mobile terminal of claim 9, wherein the controller is further configured to display a second image including information related to the second event is only displayed on the touch screen in response to a second touch and drag from the second notification icon on the curved surface to the front surface of the touch screen.

11. The mobile terminal of claim 10, wherein the first and second images are independently displayed from each other, in response to the first and second touch and drag, respectively.

12. The mobile terminal of claim 9,
wherein the bar type image of the first notification icon has a first color and the bar type image of the second notification icon has a second color different from the first color.

13. The mobile terminal of claim 9, wherein the controller is further configured to display status information on the touch screen including one or more graphic objects indicating at least one remaining battery life, signal strength, current time and an occurrence of an event.

14. The mobile terminal of claim 13, wherein the touch screen has a length that is longer than its width, and
wherein the one or more graphic objects are displayed along a widthwise direction and the first and second notification icons are arranged in a lengthwise direction.

15. The mobile terminal of claim 1, wherein the curved surface includes a left curved surface and a right curved surface at both sides of touch screen, and
wherein the indicator and the first notification icon are displayed on at least one of the left curved surface and the right curved surface.

16. The mobile terminal of claim 1, wherein a size of the first image is gradually changed according to a path of the first touch and drag.

17. The mobile terminal of claim 16, wherein the first image is generated at the front surface of the touch screen as the first touch and drag moves in the path from the curved surface to the front surface of the touch screen.

18. The mobile terminal of claim 17, wherein the controller is further configured to vary the processing of the first image based on a release point of the first touch and drag.

19. A mobile terminal, comprising:
a wireless communication unit configured to provide wireless communication;
a touch screen having a front surface and a curved surface extending from the front surface of the touch screen; and
a controller configured to:
display an indicator informing an incoming call on the touch screen in response to receiving the incoming call,
connect a call related to the incoming call, in response to an input for connecting the call related to the incoming call during displaying of the indicator informing the incoming call on the touch screen,
display a first notification icon informing a missed call related to the incoming call at a first preset location on the curved surface of the touch screen if the input for connecting the call related to the incoming call is not received, wherein the first notification icon is displayed after the indicator disappears from the touch screen, and
only display a first image including information related to the missed call on the touch screen in response to a first touch and drag from the first notification icon on the curved surface of the touch screen to the front surface of the touch screen, wherein the information related to the missed call includes at least one of a phone number or a name of a counterpart,
wherein the first image is maintained if the first touch and drag is connected from one side to the other side of the touch screen, and
wherein the first image disappears if the first touch and drag is released before reaching the other side of the touch screen.

* * * * *